(No Model.)
K. C. BULLARD.
HARROW.
No. 490,336. Patented Jan. 24, 1893.
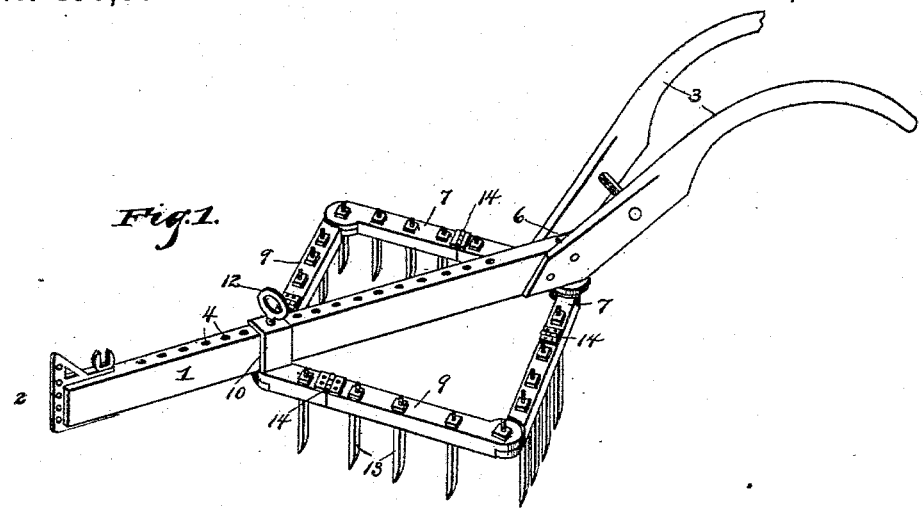
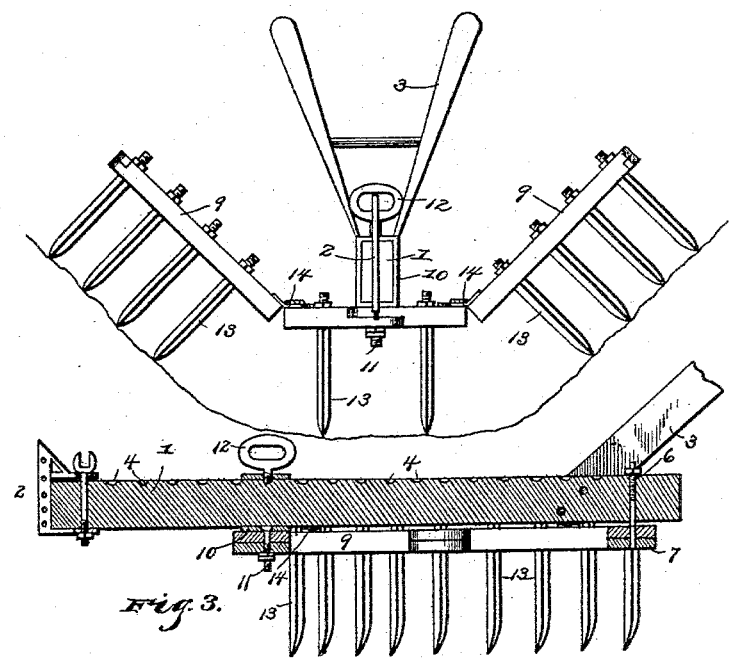
Witnesses
B. S. Ober
J. H. Siggers
Inventor
Kennedy C. Bullard,
By his Attorneys,
C. A. Snow & Co.

UNITED STATES PATENT OFFICE.

KENNEDY C. BULLARD, OF MILLEDGEVILLE, GEORGIA, ASSIGNOR OF ONE-HALF TO BURKE D. BROWN, OF SAME PLACE.

HARROW.

SPECIFICATION forming part of Letters Patent No. 490,336, dated January 24, 1893.

Application filed April 30, 1892. Serial No. 431,257. (No model.)

*To all whom it may concern:*

Be it known that I, KENNEDY C. BULLARD, a citizen of the United States, residing at Milledgeville, in the county of Baldwin and State of Georgia, have invented a new and useful Harrow, of which the following is a specification.

This invention relates to improvements in harrows or cultivators; and the objects in view are to provide a harrrow of improved construction, whereby it may be adjusted in width so as to bring its teeth close together or a desired distance apart, and whereby it may cover more or less surface; to provide means for locking or securing the harrow in such adjustment, and to adapt the harrow to simultaneously harrow or operate upon the center and opposite inclined sides of a furrow.

With these and other objects in view, the invention consists in certain features of construction, hereinafter specified and particularly pointed out in the claim.

Referring to the drawings:—Figure 1 is a perspective view of a harrow constructed in accordance with my invention. Fig. 2 is a front elevation, the sides being upturned so as to cultivate the center and sides of a furrow. Fig. 3 is a vertical longitudinal section.

Like numerals of reference indicate like parts in all the figures of the drawings.

In practicing my invention, I employ a beam 1, rectangular in cross-section, and provided at its front extremity with a draft clevis 2, and at its rear extremity with a pair of upwardly and rearwardly diverging handles 3. The upper side of the beam is further provided at intervals with indentations or cavities 4, arranged a short distance apart. A pivoting-bolt 6 passes downwardly through the rear end of the beam, and through the overlapped ends of a pair of harrow-bars 7. These harrow-bars have pivoted to their rear ends, by bolts 8, a pair of front, forwardly-disposed converging harrow-bars 9, whose front ends overlap and are pivoted to a sleeve 10, which is mounted for sliding on the beam 1. The pivoting is obtained through the medium of a bolt 11, which depends from the under side of the sleeve and is provided with a nut. The upper side of the sleeve is perforated, and has threaded therein a screw 12, the lower end of which is designed to take into and engage with any one of the cavities 4. It will be seen that the harrow-bars being provided with suitable teeth 13, and connected as described, the frame as a whole may be made wide or narrow by simply sliding the sleeve 10 to a desired point along the beam, and securing the screw in any of the cavities. Of course the narrower the harrow-frame is made the more closely will the teeth travel to each other, and the more thorough the pulverization resulting from the harrowing operation. Each of the bars 7 and 9 is preferably formed in sections, the inner ends of which are hinged at 14, so that the outer portions of the bars 8 and 9, or those beyond the hinges, form flaps or wings that may be upwardly inclined and thus harrow the sides of the furrows, simultaneous with the harrowing of the centers of the furrows by the intermediate portions of the harrow-bars.

From the foregoing description in connection with the accompanying drawings, it will be seen that I have provided a harrow embodying great simplicity of construction, that is capable of being quickly and readily adjusted to form wide and narrow harrows, and which is adapted for harrowing the sides and centers of furrows at one operation.

Having described my invention, what I claim is:—

In a harrow, the combination with a beam, of a pair of rear harrow-bars, each consisting of two hinged sections, pivotal connections between the rear ends of the harrow-bars and the beam, two front harrow-bars each consisting of two sections hinged together, the outer sections being pivoted to the outer sections of the rear harrow-bars, and the front sections pivotally connected to each other and a sleeve mounted loosely on the beam and adapted to be adjusted and pivotal connections between the front sections of the front bars and the sleeve, substantially as specified.

In testimony that I claim the foregoing as my own I have hereto affixed my signature in the presence of two witnesses.

KENNEDY C. BULLARD.

Witnesses:
BEN. J. FOWLER,
FLEMING G. GRIEVE.